US012780387B1

(12) United States Patent
Dharmadhikari et al.

(10) Patent No.: US 12,780,387 B1
(45) Date of Patent: Nov. 3, 2026

(54) MARINE DRIVES AND MARINE VESSELS HAVING COOLING SYSTEMS

(71) Applicant: Brunswick Corporation, Mettawa, IL (US)

(72) Inventors: Chetan A. Dharmadhikari, Brookfield, WI (US); Robert Dreyer, Appleton, WI (US); Brennan J. Kelly, Urbana, IL (US); David J. Waldvogel, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 763 days.

(21) Appl. No.: 17/978,758

(22) Filed: Nov. 1, 2022

(51) Int. Cl.
*B63H 20/28* (2006.01)
*B60L 50/60* (2019.01)
(Continued)

(52) U.S. Cl.
CPC ............ *B63H 20/285* (2013.01); *B60L 50/66* (2019.02); *B63H 20/02* (2013.01); *B63H 20/32* (2013.01); *H01M 10/46* (2013.01); *H01M 10/613* (2015.04); *H01M 10/625* (2015.04); *H01M 10/6568* (2015.04); *H02K 5/203* (2021.01);
(Continued)

(58) Field of Classification Search
CPC ...... B63H 20/285; B63H 20/02; B63H 20/32; B63H 21/17; B63H 20/30; B63H 20/28; B63H 23/24; B60L 50/66; H01M 10/46; H01M 10/613; H01M 10/625; H01M 10/6568; H01M 2220/20; H02K 5/203; H02K 9/193; H02K 11/0094; F01P 3/202; F01P 5/12; F01P 2050/02; Y02T 70/50;
(Continued)

(56) References Cited

U.S. PATENT DOCUMENTS 3,721,104 A 3/1973 Adler
4,836,123 A * 6/1989 Grinde .................... F02B 63/04 440/6

(Continued)

FOREIGN PATENT DOCUMENTS

CN 102407931 B 11/2013
CN 205930240 U 2/2017

(Continued)

OTHER PUBLICATIONS

JP_2014239607_A Machine Translation Copy (Year: 2014).*

(Continued)

*Primary Examiner* — Lars A Olson
*Assistant Examiner* — Eric Anthony Starck
(74) *Attorney, Agent, or Firm* — Andrus Intellectual Property Law, LLP

(57) ABSTRACT

A marine drive for propelling a marine vessel in water. The marine drive includes a casing configured to be coupled to the marine vessel, where the casing is positionable in the water. A propulsor is supported by the casing and is configured to generate a thrust force in the water. A power system is configured to power the propulsor, where at least a portion of the power system is located in the casing. A cooling system is configured for cooling the power system. The cooling system includes a pump located outside the casing and is configured to pump the water for cooling at least the portion of the power system in the casing.

22 Claims, 10 Drawing Sheets

(51) Int. Cl.

| | |
|---|---|
| ***B63H 20/02*** | (2006.01) |
| ***B63H 20/32*** | (2006.01) |
| ***H01M 10/46*** | (2006.01) |
| ***H01M 10/613*** | (2014.01) |
| ***H01M 10/625*** | (2014.01) |
| ***H01M 10/6568*** | (2014.01) |
| ***H02K 5/20*** | (2006.01) |
| ***H02K 9/193*** | (2006.01) |
| ***H02K 11/00*** | (2016.01) |

(52) U.S. Cl.
CPC ......... *H02K 9/193* (2013.01); *H02K 11/0094* (2013.01); *H01M 2220/20* (2013.01)

(58) Field of Classification Search
CPC ... Y02E 60/10; Y02E 60/50; B63J 2/12; B63J 2003/002
USPC ........ 440/88 C, 88 M, 88 P, 88 HE, 88 R, 6, 440/88 D
See application file for complete search history.

(56) References Cited

U.S. PATENT DOCUMENTS

| | | | | | |
|---|---|---|---|---|---|
| 5,045,001 | A * | 9/1991 | Borst | F02B 61/045 | 440/88 P |
| 5,304,079 | A * | 4/1994 | Karls | F01P 3/202 | 123/41.15 |
| 5,599,217 | A | 2/1997 | Ferrante | | |
| 5,634,833 | A * | 6/1997 | Watanabe | F01P 3/205 | 440/88 N |
| 6,273,771 | B1 | 8/2001 | Buckley et al. | | |
| 7,066,777 | B2 | 6/2006 | Maseltee | | |
| 7,172,831 | B2 | 2/2007 | Kumar et al. | | |
| 7,264,520 | B1 | 9/2007 | Taylor et al. | | |
| 7,503,819 | B1 | 3/2009 | Jaeger et al. | | |
| 7,569,954 | B2 | 8/2009 | Tölle et al. | | |
| 7,975,637 | B1 | 7/2011 | Nida | | |
| 8,011,982 | B1 | 9/2011 | Baier | | |
| 8,043,132 | B1 | 10/2011 | Wyant | | |
| 8,137,146 | B2 | 3/2012 | Cohen | | |
| 8,298,023 | B2 * | 10/2012 | Daikoku | B63J 3/02 | 440/75 |
| 8,298,025 | B2 * | 10/2012 | Eichinger | F01P 3/202 | 440/88 C |
| 8,336,319 | B2 | 12/2012 | Johnston et al. | | |
| 8,535,104 | B1 | 9/2013 | Nida | | |
| 8,763,566 | B1 | 7/2014 | Taylor et al. | | |
| 8,864,538 | B1 | 10/2014 | Arbuckle et al. | | |
| 8,944,865 | B1 | 2/2015 | Krabacher et al. | | |
| 9,234,450 | B2 | 1/2016 | England et al. | | |
| 9,403,588 | B1 | 8/2016 | George et al. | | |
| 9,446,828 | B1 | 9/2016 | Groeschel et al. | | |
| 9,446,830 | B2 | 9/2016 | Hartmeyer et al. | | |
| 9,680,190 | B1 | 6/2017 | Xia | | |
| 9,802,687 | B2 * | 10/2017 | Davis | B63H 20/00 | |
| 9,815,539 | B1 | 11/2017 | Provost | | |
| 10,047,661 | B1 | 8/2018 | Torgerud | | |
| 10,336,429 | B1 | 7/2019 | Amerling et al. | | |
| 10,366,429 | B2 | 7/2019 | Amerling et al. | | |
| 10,378,423 | B1 | 8/2019 | Reichardt et al. | | |
| 10,890,098 | B1 | 1/2021 | Kurzynski et al. | | |
| 11,072,408 | B1 | 7/2021 | Kurzynski et al. | | |
| 11,286,027 | B1 | 3/2022 | Dharmadhikari et al. | | |
| 11,293,335 | B1 | 4/2022 | Radavich et al. | | |
| 11,352,937 | B1 | 6/2022 | Dreyer et al. | | |
| 2006/0130888 | A1 | 6/2006 | Yamaguchi et al. | | |
| 2009/0163093 | A1 * | 6/2009 | Fukuoka | B63H 20/285 | 440/88 P |
| 2010/0279153 | A1 | 11/2010 | Payne | | |
| 2016/0059949 | A1 | 3/2016 | Rebele et al. | | |
| 2017/0015397 | A1 * | 1/2017 | Mitchell | B60P 3/1033 | |
| 2018/0354339 | A1 | 12/2018 | Smith et al. | | |
| 2020/0255112 | A1 * | 8/2020 | Doremus | B63H 21/17 | |
| 2020/0370463 | A1 | 11/2020 | Saruwatari | | |
| 2022/0219798 | A1 * | 7/2022 | Achard | B60L 58/26 | |

FOREIGN PATENT DOCUMENTS

| | | | | | |
|---|---|---|---|---|---|
| CN | 209441180 | U | 9/2019 | | |
| CN | 112678139 | A | 4/2021 | | |
| CN | 213743657 | U | 7/2021 | | |
| GB | 2388184 | A | 11/2003 | | |
| JP | 2006103537 | A | 4/2006 | | |
| JP | 4193683 | B2 | * | 12/2008 | B63H 20/28 |
| JP | 2014239607 | A | * | 12/2014 | |
| KR | 20160046354 | A | * | 4/2016 | H01M 10/486 |
| KR | 20210015197 | A | 2/2021 | | |
| WO | 2021055758 | A1 | 3/2021 | | |
| WO | WO-2023085948 | A1 | * | 5/2023 | B63H 20/285 |

OTHER PUBLICATIONS

JP_4193683_B2 Machine Translation Copy (Year: 2008).*
Propeller [online]. https://en.wikipedia.org/wiki/Propeller, 2021 [archived on Jan. 27, 2021]. Retrieved from the Internet: <URL: https://web.archive.org/web/20210127063246/https://en.wikipedia.org/wiki/Propeller >. (Year: 2021).*
Ram Pressure [online]. https://en.wikipedia.org/wiki/Ram_pressure, 2020 [archived on Nov. 26, 2020]. Retrieved from the Internet: <URL: https://web.archive.org/web/20201126191203/https://en.wikipedia.org/wiki/Ram_pressure >. (Year: 2020).*
KR-20160046354-A text (Year: 2016).*

* cited by examiner

MARINE DRIVES AND MARINE VESSELS HAVING COOLING SYSTEMS

FIELD

The present disclosure generally relates to marine drives and marine vessels, and in particular marine drives and marine vessels having cooling systems.

BACKGROUND

The following U.S. Patents provide background information and are incorporated by reference in entirety.

U.S. Pat. No. 6,273,771 discloses a control system for a marine vessel that incorporates a marine propulsion system for attachment to a marine vessel and connection signal communication to a serial communication bus and a controller. A plurality of input devices and output devices are also connected in signal communication with the communication bus. A bus access manager such as a CAN Kingdom network is connected in signal communication with the controller to regulate the incorporation of additional devices in signal communication with the bus. The input and output devices can each transmit messages to the serial communication bus for receipt by other devices.

U.S. Pat. No. 7,264,520 discloses a cooling system for an outboard motor that pumps water from a body of water through certain selected portions of the outboard motor and through a heat exchanger which, in turn, comprises a coolant conduit that is directed to conduct the coolant in thermal communication with various portions of the outboard motor. The engine block is cooled by a flow of the coolant and an engine head is cooled by a flow of water from the body of water. Other heat emitting devices are connected in thermal and fluid communication with the water and coolant conduits.

U.S. Pat. No. 8,011,982 discloses a support system for attaching an outboard motor to a transom of a marine vessel. Preselected gaps between restricting and restricted surfaces are sized to allow nominal vibration at low operating speeds of the outboard motor while restricting excessive lateral movement during operation at high speed.

U.S. Pat. No. 8,298,025 discloses cooling systems and methods for hybrid marine propulsion systems. A first cooling circuit is arranged to convey raw cooling water through an internal combustion engine and to at least one drive component of a drive unit for the marine propulsion system. A second control circuit is arranged to convey raw cooling water through an electric motor. The system is arranged such that raw cooling water in the second cooling circuit is conveyed to the first cooling circuit to cool the drive component without cooling the component of the internal combustion engine.

U.S. Pat. No. 8,763,566 disclose cooling systems for marine engines provided with various cooling channels to remove heat from different portions of the engine.

U.S. Pat. No. 8,864,538 discloses systems and methods cooling a marine propulsion system on a marine vessel. A lift pump pumps raw cooling water from a body of water in which the marine vessel is situated. The lift pump pumps the raw cooling water through an open cooling circuit from an upstream inlet for receiving the raw cooling water to a downstream outlet for discharging the cooling water back to the body of water. A control circuit controls operation of the lift pump. At least one sensing device indicates whether the lift pump is connected to the body of water. The sensing device is in communication with the control circuit. The control circuit prevents operation of the lift pump when the sensing device indicates that the lift pump is not connected to the body of water.

U.S. Pat. No. 8,944,865 discloses a system for controlling power in a hybrid marine vessel arrangement. A first water sensor senses a presence of water at a first location on the marine vessel. An intermediate switch is activated when the first water sensor senses the presence of water at the first location. An interlock switch disconnects power to at least one high voltage electrical component on the marine vessel when the intermediate switch is activated.

U.S. Pat. No. 9,446,828 discloses an apparatus for mounting a marine drive to a hull of a marine vessel. An outer clamping plate faces an outside surface of the hull and an inner clamping plate faces an opposing inside surface of the hull. A marine drive housing extends through the hull. The marine drive housing is held in place with respect to the hull by at least one vibration dampening sealing member which is disposed between the inner and outer clamping plates. The inner and outer clamping plates are held at a fixed distance from each other so that a consistent compression force is applied to the vibration dampening sealing member.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a marine drive for propelling a marine vessel in water. The marine drive includes a casing configured to be coupled to the marine vessel, where the casing is positionable in the water. A propulsor is supported by the casing and is configured to generate a thrust force in the water. A power system is configured to power the propulsor, where at least a portion of the power system is located in the casing. A cooling system is configured for cooling the power system. The cooling system includes a pump located outside the casing and is configured to pump the water for cooling at least the portion of the power system in the casing.

Certain embodiments further include a mounting bracket configured to mount the casing to the marine vessel, where the pump is on the mounting bracket. In certain embodiments, the marine drive includes an outboard motor and the mounting bracket includes a transom bracket. The pump may be located on the mounting bracket such that the pump is at least partially submerged when the marine drive is coupled to marine vessel and the marine vessel is in the water.

In certain embodiments, the propulsor is rotated by an electric motor, the power system includes a battery configured to power the electric motor, and a battery charger is provided and configured to charge the battery.

In certain embodiments, the cooling system includes a water jacket configured to receive the water from the pump to cool the power system.

Certain embodiments further include a mounting bracket configured to mount the casing to the marine vessel, the cooling system includes a conduit configured to convey the water to the pump, and the conduit is located on the mounting bracket so as to position an inlet of the conduit in the water when the marine drive is coupled to marine vessel and the marine vessel is in the water. The conduit may be configured such that the inlet opens primarily horizontally when the marine drive is coupled to marine vessel and the marine vessel is in the water.

In certain embodiments, the propulsor is rotated by a powerhead, an inlet is formed in the casing, and the pump is a first pump, further including a second pump located inside the casing. The second pump is configured to provide additional water, via the inlet in the casing, for cooling the powerhead when the casing is in the water.

Certain embodiments include a flush port fluidly coupled to the pump through which clean water may be provided to flush the water out of the pump.

In certain embodiments, the cooling system includes a heat exchanger fluidly coupled to the pump, the heat exchanger comprising a first circuit through which the water may flow and a second circuit through which a fluid may flow while remaining separated from the water, wherein the heat exchanger is configured such that the water cools the fluid and the fluid cools the power system.

In certain embodiments, the heat exchanger is located outside the casing.

Another embodiment generally relates to a marine drive for propelling a marine vessel in water. The marine drive includes a casing configured to be coupled to the marine vessel. The casing is positionable in the water. A propulsor is supported by the casing and is configured to generate a thrust force in the water. A power system is configured to power the propulsor. At least a portion of the power system is located in the casing. A cooling system is configured for cooling the power system. The cooling system includes a pump that is located inside the casing and is configured to pump the water for cooling at least the portion of the power system in the casing. The cooling system further includes a conduit configured to convey the water to the pump. The conduit is at least partially outside the casing.

Certain embodiments further include a mounting bracket configured to mount the casing to the marine vessel, where the conduit is located on the mounting bracket so as to position an inlet of the conduit in the water when the marine drive is coupled to marine vessel and the marine vessel is in the water.

In certain embodiments, the propulsor is rotated by a powerhead, where an inlet is formed in the casing, and where the pump is a first pump. A second pump is also provided and located inside the casing, the second pump being configured to provide additional water, via the inlet in the casing, for cooling the powerhead when the casing is in the water.

Another embodiment generally relates to a marine vessel configured to float in water. The marine vessel includes a hull and a marine drive coupled to the hull. The marine drive includes a casing configured to be coupled to the marine vessel. The casing is positionable in the water. A propulsor is supported by the casing and is configured to generate a thrust force in the water. A power system is configured to power the propulsor. At least a portion of the power system is located in the casing. A cooling system is configured for cooling the power system. The cooling system includes a pump mounted on the marine vessel outside the casing. The pump is configured to pump the water for cooling at least the portion of the power system in the casing.

In certain embodiments, the cooling system is at least partially located inside of the hull.

In certain embodiments, the pump is mounted outside the hull.

In certain embodiments, the power system includes a battery configured to power the propulsor and a battery charger configured to charge the battery, the battery and the battery charger each being located inside the casing, and the powerhead including an electric motor located inside the casing and configured to rotate the propulsor.

In certain embodiments, the cooling system further includes a conduit configured to convey the water to the pump without passing through the hull that is underwater when the marine vessel is floating in the water. In certain embodiments, the hull extends between a bow and a stem with the marine drive being coupled at the stem. An inlet of the conduit opens towards the bow such that ram pressure assists in conveying the water to the pump when the marine vessel is propelled forwardly in the water.

In certain embodiments, the cooling system further includes a heat exchanger located outside the casing and being fluidly coupled to the pump. The heat exchanger includes a first circuit through which the water may flow and a second circuit through which a fluid may flow while remaining separated from the water, where the heat exchanger is configured such that the water cools the fluid and the fluid cools the power system.

Various other features, objects and advantages of the disclosure will be made apparent from the following description taken together with the drawings.

BRIEF DESCRIPTION OF THE DRAWINGS

The present disclosure is described with reference to the following drawings.

DETAILED DISCLOSURE

Figure 1:
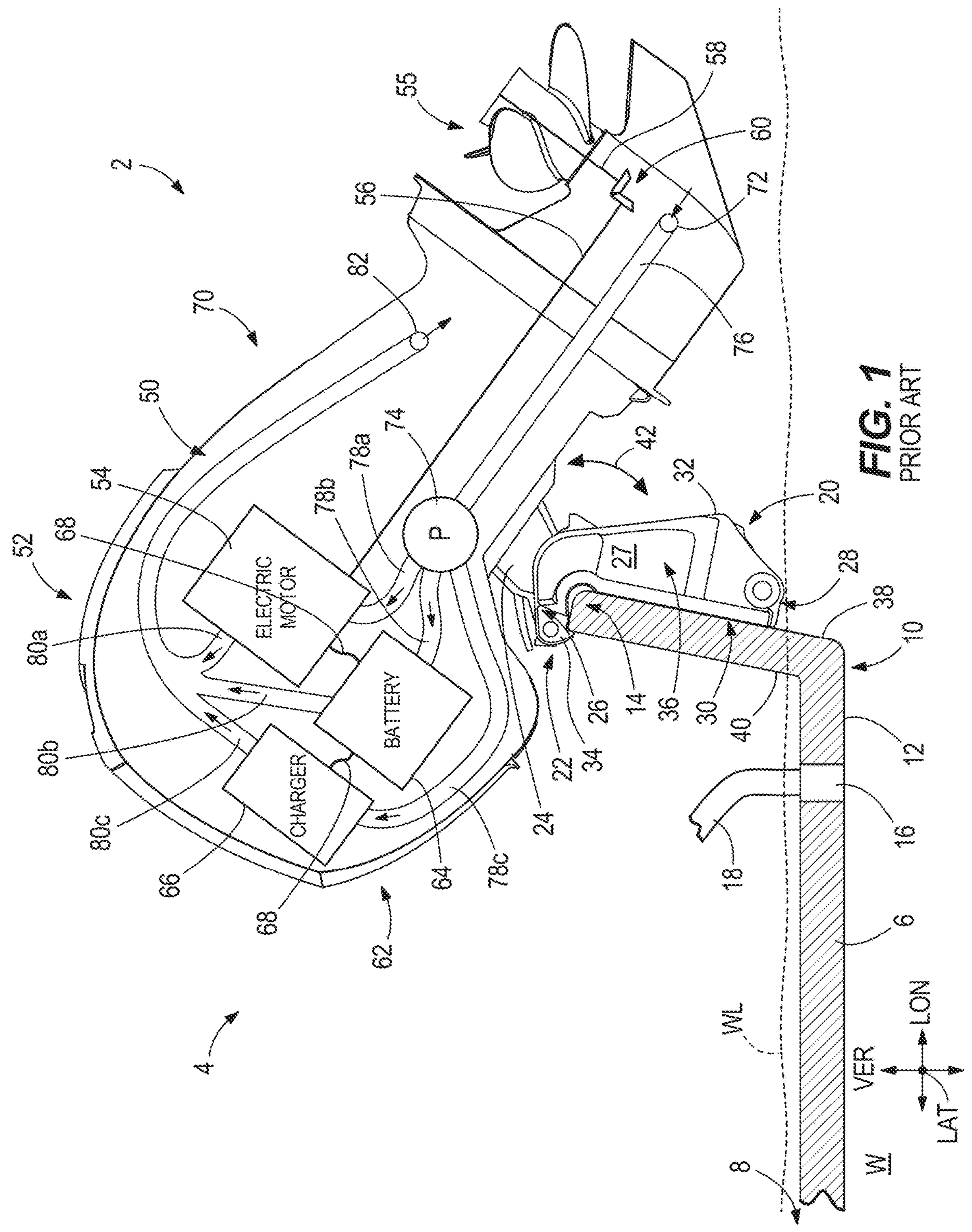
FIG. 1 PRIOR ART
FIG. 1 is a sectional side view of a marine drive and a marine vessel as known in the art.

FIG. 1 shows an example of a marine drive 2 for propelling a marine vessel 4 in water W as presently known in the art. The marine vessel 4 includes a hull 6 that extends longitudinally LON between a bow 8 and a stern 10. The hull 6 also extends laterally LAT between port and starboard sides, and vertically VER between a bottom 12 and a top 14. A waterline WL is formed by the water W between the bottom 12 and the top 14 of the hull 6 when the marine vessel 4 is floating in the water W. A through-hole 16 extends through the hull 6, which is underwater (i.e., below the waterline WL) when the marine vessel 4 is the in the water W. A conduit 18 fluidly couples the through-hole 16 to components requiring a source of water, such as a water purification system or a cooling system. By way of example, the cooling system may be configured to use the water from the through-hole 16 to cool an inboard or stern drive propulsor, or a bank of batteries or other energy storage devices (not shown).

A mounting bracket 20 couples the marine drive 2 to the hull 6. The marine drive 2 of FIG. 1 is particularly an outboard motor coupled to the hull 6 with a transom bracket as the mounting bracket 20. In other embodiments, the mounting bracket 20 is configured to couple other types of marine drives 2 to the marine vessel 4 (e.g., a stern drive) in a manner known in the art.

The mounting bracket 20 of FIG. 1 includes a base portion 22 configured to be coupled to the hull 6, as well as an arm 24 configured to be coupled to the marine drive 4. The base portion 22 extends between a top 26 and a bottom 28, between a left 27 and a right (not labeled), and between a front 30 and a back 32. The base portion 22 has an upper portion 34 that is supported on the top 14 of the hull 6 and a lower portion 36 supported by the outside 38 of the hull 6, in particular at the stern 10. The base portion 22 may be fixed in place at the stern 10 via methods known in the art, such as clamps that engage with the inside 40 of the hull 6 at the stern 10. The arm 24 is coupled to the base portion 22 such that the arm 24 is rotatable and tiltable relative thereto such that the marine drive 2 can be steered and be trimmed in and out of the water (indicated by arrow 42) in a manner known in the art.

With continued reference to FIG. 1, the marine drive 2 includes a casing 50 that is coupled to the marine vessel 4 via the mounting bracket 20. The casing 50 is trimmable as shown by the arrow 42 so as to be positionable in the water W and out of the water W. By way of example, the casing 50 may include an upper and a lower gearcase coupled together and enclosed within a cowling (not shown) in a manner known in the art. A propulsor 55 is supported by the casing 50 and is configured for generating a thrust force to propel the marine vessel 4 in the water W. The marine drive 2 of FIG. 1 is an electric outboard motor having an electric motor 54 as its powerhead 52. The electric motor 54 is operatively coupled to provide torque to a propulsor 55. In particular, the electric motor 54 rotates a driveshaft 56 that rotatably engages a propeller shaft 58 coupled to a propeller as the propulsor 55, specifically via bevel gears 60 in a manner known in the art.

The electric motor 54 is powered by a power system 62. The power system 62 includes a battery 64 (e.g., a lithium-ion, Ni—Cd, or NiMH battery) that provides energy to rotate the electric motor 54. The power system 62 further includes a battery charger 66 that delivers energy to the charge the battery 64 via wires 68 in a manner known in the art. In use, energy is delivered to the battery charger 66 (e.g., to charge the battery 64 and/or directly power other devices) via a connection to an external energy source. By way of example, the external energy source may be a standard residential power outlet, conventional shore power at a marina, or a charging station such as those used for charging electric automobiles (e.g., “Supercharger” charging stations operated by Tesla, Inc. of Austin, TX).

While the power system 62 is generally described as being configured to power the propulsor 55 (i.e., via the powerhead 52), it should be recognized that the power system may also or alternatively power other devices or systems (e.g., HVAC systems, 120V outlets or DC charging ports inside the marine vessel, lighting, communications systems such as radios, and/or the like).

The marine drive 2 further includes a cooling system 70 for cooling the electric motor 54, the battery 62, and the charger 64. An inlet 72 is formed in the casing 50 at a position that is submerged underwater when the casing 50 is positioned in the water W. The inlet 72 is fluidly connected to a pump 74 inside the casing 50 via a conduit 76 that extends inside the casing 50 between the inlet 72 and the pump 74. The pump 74 is also fluidly connected to the components of the power system 62 (and/or other components, such as the electric motor 54) to be cooled, here via conduits **78*a*, 78*b*, 78*c* extending inside the casing 50 between the pump 74 and the electric motor 54, the battery 64, and the charger 66**, respectively.

The water provided for cooling the electric motor 54, the battery 64, and the charger 66 then flows away via conduits **80*a*, 80*b*, 80*c*, respectively, that extend inside the casing 50 to an outlet 82 to exit the marine drive 2. While not expressly shown, components may be surrounded by water jackets to provide cooling in a conventional manner, whereby water flowing through the water jackets thereby cools the corresponding component. In this manner, the pump 74 causes water from the water W in which the marine vessel 4 is floating to enter the casing 50 via the inlet 72, to cool one or more components of the power system 62 within the casing 50, and to exit the casing 50 via the outlet 82**.

Through experimentation and development, the present inventors have recognized problems with cooling systems for marine drives and marine vessels presently known in the art. In particular, the water W in which the marine vessel 4 resides is required for cooling within the cooling system 70. As discussed above, this water is provided to the cooling system via the inlet 72 in the casing 50, thereby requiring the casing 50 to be left in the water W whenever the cooling system 70 is operated. The present inventors have recognized that the cooling system 70 is not only needed when the powerhead 52 is operating to propel the marine vessel 4 in water W, but also when other components are drawing power from the power system 62 (thus generating heat that requires cooling). A substantial amount of heat is generated when the battery 64 is charged, both from the battery 64 and the battery charger 66, each of which must be cooled for safety, reliability, and operational efficiency. The problem is further exacerbated in the context of electric propulsors, and especially those designed for fast charging of the batteries. Heat is also generated any time components draw power from the battery 64, such as when using an HVAC system, water heaters, audio/visual devices, lighting, depth gauge, GPS, communication devices, and the like). As such, the cooling system 70 must operate to maintain safe and efficient operating temperatures for the battery 64 and the charger 66, and also to prevent thermal runaway during both charging and discharging states of operation.

The marine drive 2 is typically in the water W during a relatively fast discharging event (e.g., when using the powerhead 52 to cause the propulsor 55 to propel the marine vessel 4). However, when the batteries are being charged or the marine drive 2 and/or marine vessel 4 are otherwise being plugged into an external energy source, the marine drive 2 would not need to be left in the water W but for needing the inlet 72 of the casing 50 to remain in the water to supply the pump 74. The present inventors have further recognized that leaving the casing 50 in the water W any longer than necessary, and particularly for prolonged periods of time, is not without consequence. Extended time in the water causes fouling, corrosion, and general deterioration of the marine drive 2. Moreover, during cold weather, ice can form and cause damage within the cooling system 70 and the marine drive 2 generally.

Figure 2:
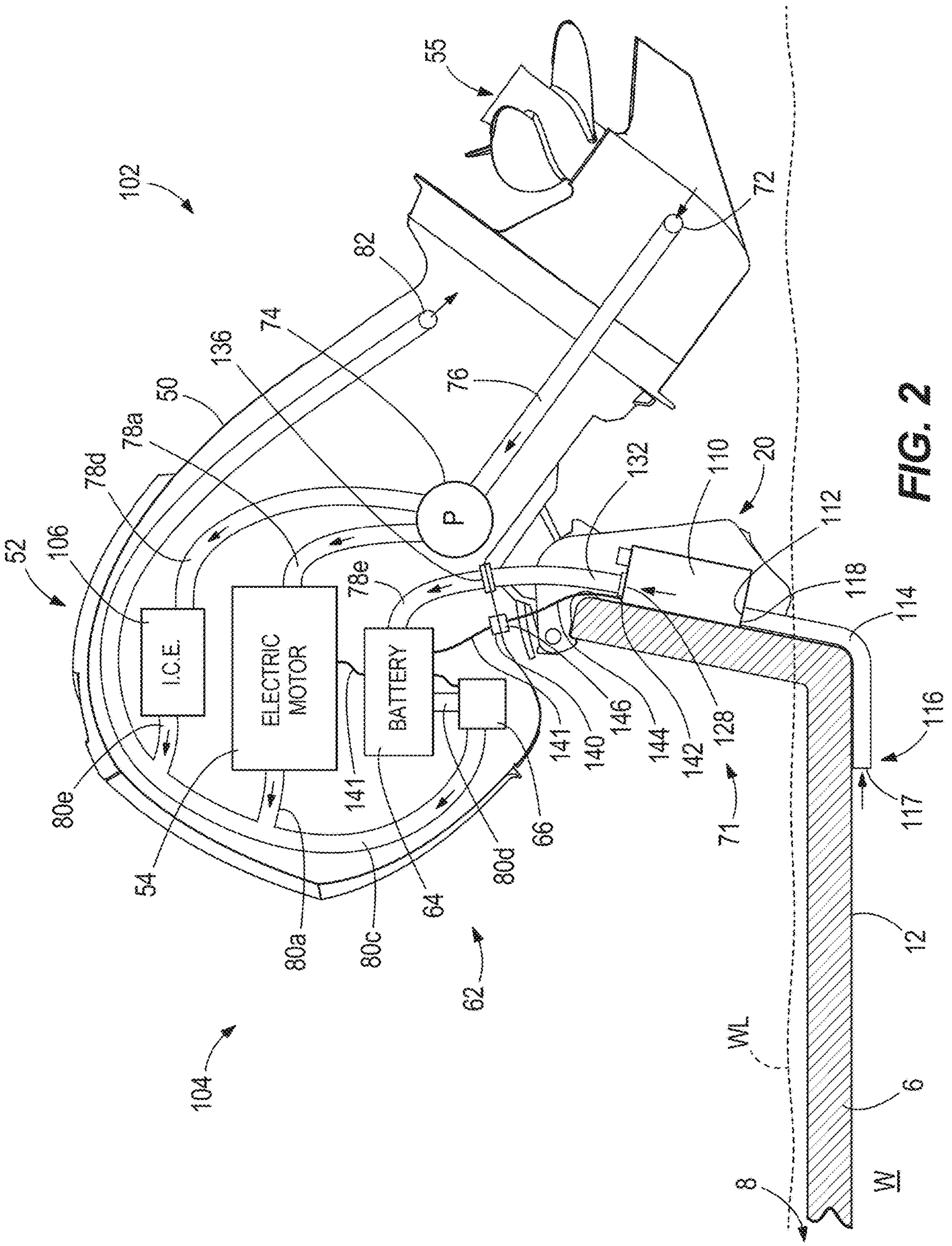
FIG. 2 is a sectional side view of one embodiment of a marine drive and a marine vessel having a cooling system according to the present disclosure.

FIG. 2 depicts a marine drive 102 and marine vessel 104 according to the present disclosure, which addresses the unmet needs of marine drives and marine vessels identified above. The same reference numbers are generally used from FIG. 1 where the same elements may be employed. The marine drive 102 has a hybrid propulsion system, whereby the powerhead 52 includes both an internal combustion engine (ICE) 106, such as a gasoline or diesel engine, as well as an electric motor 54. The electric motor 54 and the ICE 106 are each configured to provide torque to the propeller (propulsor 55) in a manner known in the art (e.g., via driveshafts, a propeller shaft, gearsets, and/or the like), which for clarity is not shown here. The electric motor 54 is powered by the power system 62, which includes both a battery 64 and a battery charger 66 located inside the casing 50. It should be recognized that components of the power system 62 may also be partially outside the casing 50 (e.g., a battery pack partially extending outside the casing), or entirely outside the casing 50, as discussed further below.

Figure 3:
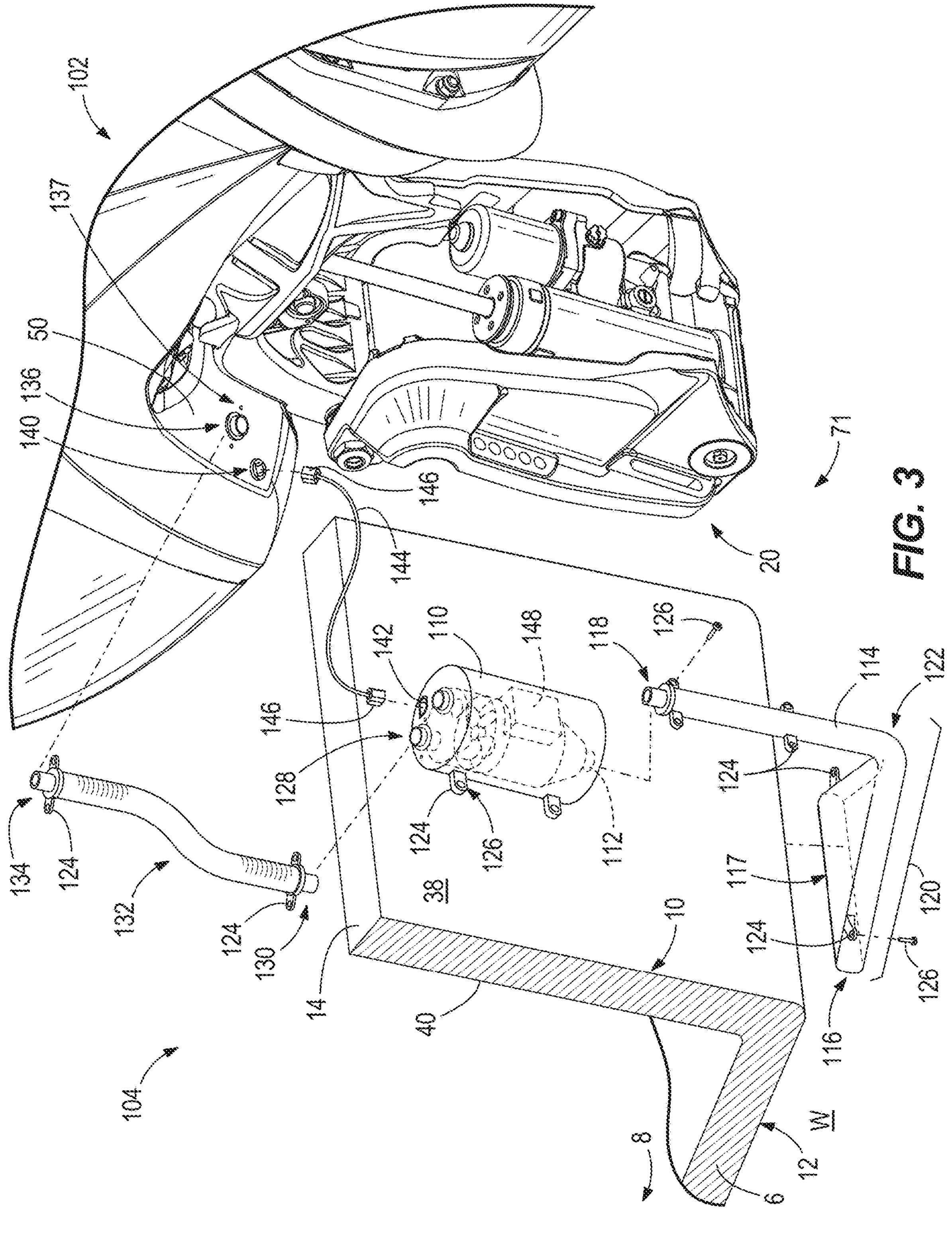
FIG. 3 is an isometric exploded close-up view showing portions of the cooling system from FIG. 2.

The powerhead 52 is cooled via the pump 74, which provides water from the inlet 72 in the casing 50 via conduit **78*a* to cool the electric motor 54 and via conduit 78*d* to cool the ICE 106, which exits the ICE 106 via conduit 80*e*. In contrast to the marine drives presently known in the art, the cooling system 71 of FIG. 2 is configured for cooling the power system 62 via a pump 110 that does not receive the water via the inlet 72 in the casing 50. Here, the pump 110 has an inlet 112 that draws in the water W via a conduit 114 that extends at least partially outside the casing 50. As shown in FIGS. 2 and 3, the conduit 114 extends between a first end 116 and an opposite second end 118, here bending ninety-degrees at an elbow 122 at a position therebetween. When coupled to the marine vessel 104, the first end 116 of the conduit 114** opens primarily horizontally and the second end opens primarily vertically.

The first end 116 is positioned so as to be submerged underwater when the marine vessel 104 is floating in the water W (i.e., under the waterline WL formed on the hull 6). It should be recognized that filters, screens, and/or the like may also be provided to prevent debris from the water W being drawn into the first end 116. The second end 118 is fluidly coupled to the inlet 112 of the pump 110, such as via hose clamps, press-fit, quick connect fittings, or other types of fluid mating connectors known in the art. In certain embodiments, such as that shown in FIG. 6, the pump 110 is positioned such that the inlet 112 itself is positioned in the water W, thereby not requiring a conduit 114 between the inlet 112 and the water W.

As shown in FIGS. 2-3, the inside of the conduit 114 has a larger cross-section at the first end 116 than at the second end 118. In particular, the conduit 114 includes a funnel 120 that reduces in width (and thus cross-sectional area) from the first end 116 to the elbow 122. The conduit 114 then has a generally uniform cross-sectional area between the elbow 122 and the second end 118 that is coupled to the pump 110. Tabs 124 with openings are provided at locations on the conduit 114 for coupling the conduit 114 to the hull 6, here on both the bottom 12 and stern 10 via screws 126, rivets, welds, or other fasteners known in the art. The tabs 124 may themselves be integrally formed or coupled to the pump 110 using methods known in the art. The conduit 114 may also or alternatively be formed in part within the hull 6 while not extending into the inside of the hull 6 (i.e., not being a through-port). The pump 110 is also coupled to the hull 6, which may be via the same methods used for coupling the conduit 114 and/or methods others known in the art.

The conduit 114 is coupled to the marine vessel 104 such that an inlet 117 at the first end 116 faces towards the bow 8. The present inventors have discovered that this orientation advantageously results in ram pressure assisting in conveying the water from the water W to the pump 110 when the marine vessel 104 is propeller forwardly in the water. This effect is further enhanced by including the funnel 120, which captures more water at the inlet 117 to thereby increase the pressure as the water flows to the second end 118 of the conduit 114. Increasing pressure reduces power consumed by water pump. In some instances, water pressure can be sufficient to provide the necessary cooling without running the water pump. This helps reduce parasitic losses and increase the range of electric propulsion.

With continued reference to FIGS. 2 and 3, the pump 110 further includes an outlet 128 through which the water is provided for cooling the power system 62. In particular, a first end 130 of a conduit 132 is coupled to the outlet 128 of the pump 110, such as with fluid mating connectors presently known in the art. Another connector is also provided at an opposite second end 134 of the conduit 132, which is fluidly coupled to a connector 136 that extends through the casing 50 of the marine drive 2. The conduit 132 may be coupled to the hull 6 and/or to the marine drive 102 in the same or a similar manner as the conduit 114 discussed above (here via fasteners engaging openings 137 in the casing 50). The conduit 132 may alternatively be held in place by the connectors at the first end 130 and the second end 134, which may be locking-type connectors such as those used for connecting fuel lines between fuel tanks and conventional outboard motors. A conduit **78*e* (FIG. 2) extends inside the casing 50 between the connector 136 and the power system 62, here specifically to the battery 64**.

In this manner, the cooling system 71 draws in water for cooling the power system 62 or other components inside the casing 50 without entering the inlet 72 in the casing 50. Instead, water flows to the pump 110 via the conduit 114, flows through the conduit 132, enters the casing 50 through the connector 136, and then flows via the conduit **78*e* to the power system 62**.

With continued reference to FIGS. 2 and 3, the cooling system 71 is configured such that the water first cools the battery 64, such as via a water jacket or other mechanisms known in the art. The water then flows from the battery 64, via a conduit **80*d* inside the casing 50, to the charger 66. The water then flows away from the charger 66 via the conduit 80*c* to ultimately exit the marine drive 102, here via the same outlet 82 used for the water cooling the powerhead 52. It should be recognized that the water may exit the marine drive 102 via a separate outlet and/or different locations than presently shown. The present inventors have recognized that in certain configurations, the optimal operating temperature for the battery 64 is less than that of the charger 66. Therefore, it is advantageous to cool the battery 64 before cooling the charger 66, as the water leaves the battery 64 at a warmer temperature than when it entered. Additionally, it is advantageous to provide the full flow of water to the battery 64 rather than dividing the flow between the battery 64 and the charger 66** such that neither is upstream of the other.

The pump 110, which is outside the casing 50, is powered by the power system 62 that is inside the casing 50. A power connector 140 is provided through the casing 50, which is electrically connected inside the casing 50 via a wire 141 to the battery 64. Another wire 144 having connectors 146 at both ends is configured to mate with the power connector 140 in the casing 50, as well as with a power connector 142 on the pump 110. The power connector 142 is electrically connected to an electric motor 148 inside the pump 110, providing power to the electric motor 148 to pump water between the inlet 112 and the outlet 128.

Figure 4:
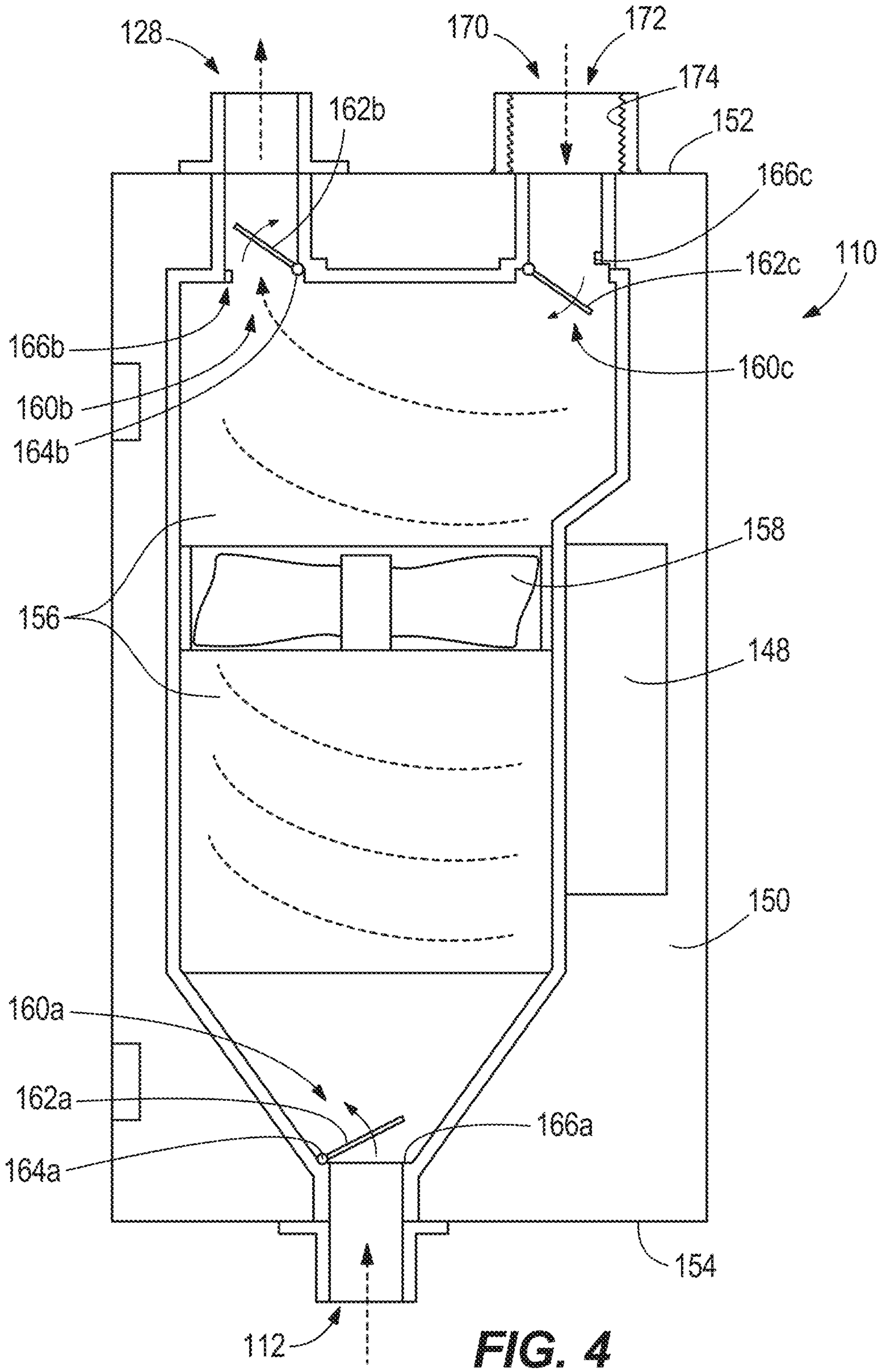
FIG. 4 is a sectional side view of a pump from the cooling system shown in FIG. 3.

FIG. 4 is a sectional view of the pump 110 shown in FIG. 3. The pump 110 includes a housing 150 that extends between a top 152 and a bottom 154. The inlet 112 is located at the bottom 154 and the outlet 128 is located at the top 152. A cavity 156 is formed inside the housing 150 in fluid connection with both the inlet 112 and the outlet 128. An electric motor 148 is powered by the battery 64 in the casing 50, as discussed above, to rotate an impeller 158 inside the cavity 156. The impeller 158 causes water to be drawn into the pump 110 through the inlet 112, and also causes water to flow out of the pump 110 via the outlet 128 in a conventional manner.

One-way valves 160*a*, 160*b* are provided between the cavity 156 and the inlet 112 and the outlet 128, and also between the cavity 156 and the inlet 112, respectively. The one-way valves 160*a*, 160*b* each include a flapper 162*a*, 162*b* and a hinge 164*a*, 164*b*, which by way of example may be separate elements or a combined elastomeric material. The one-way valves 160*a*, 160*b* each further include a shelf 166*a*, 166*b* on which the flappers 162*a*, 162*b* rest when the one-way valve 160*a*, 160*b* is closed. The shelves 166*a*, 166*b* constrain the flappers 162*a*, 162*b* to not move past them, thereby closing the valve. In this manner, the one-way valve 160*a* near the inlet 112 allows water to enter the cavity 156 via suction from operating the impeller 158 but closes to prevent the water from draining from the cavity 156 out the inlet 112.

Likewise, the one-way valve 160*b* near the outlet 128 allows water to flow from the cavity 156 to the outlet 128 via the pressure created from the impeller 158 but closes to prevent water from flowing from the outlet 128 to the cavity 156. The one-way valve 160*b* near the outlet 128 therefore prevents the water inside the cooling system (and particularly within the casing 50, see FIG. 2) from draining out through the pump 110. Together the one-way valves 160*a*, 160*b* at the inlet 112 and outlet 128 maintain the priming of the pump 110 such that when the electric motor 148 is energized, water flows with essentially no delay. The present inventors have identified that this saves energy, reduces noise, and provides more immediate cooling as needed.

The pump 110 further includes a flush port 170 that is also fluidly connected to the cavity 156. The flush port 170, like the inlet 112 and the outlet 128 includes a connector for coupling a conduit thereto. In the case of the flush port 170, the connector 172 includes female hose threads 174 such that a conventional garden hose can be threadedly engaged with the connector 172 as the conduit to the flush port 170. The flush port 170 therefore allows the operator to flush the pump 110 with clean water (e.g., potable water from a municipal supply) to flush out the water W originally drawn in from whichever lake, ocean, sea, or other body of water in which the marine vessel 104 was operated. This flushing process is advantageous to clear out debris, as well as to prevent and reduce corrosion and fouling from the water W sitting in the pump 110 over time. It should be recognized that in addition to flushing out the pump 110, the various conduits and components being cooled by the cooling system 71 are also flushed out.

The present inventors have recognized a further benefit of providing a flush port 170 on the pump 110. In particular, this allows the same cooling system 71 to be used even when the marine vessel 104 is out of the water (e.g., at dry dock), instead using outside water source connected to the flush port 170 for cooling.

Another one-way valve 160*c* is provided near the flush port 170 and may be structured like the one-way valves 160*a*, 160*b* discussed above. In short, the one-way valve 160*c* is forced into the closed position (by the impeller 158) when the pump 110 is in operation such that the flapper 162*c* rests upon the shelf 166*c*. When the one-way valve 160*c* is closed, all water pumped by the pump 110 exits via the outlet 128, rather than leaving out the flush port 170. When the pump 110 is off and water is introduced via the flush port 170, the one-way valve 160*c* is forced open, causing any water in the cavity 156 of the pump 110 (and also the water entering the flush port 170) to exit the outlet 128. During this time, the one-way valve 160*a* near the inlet 112 is also forced closed by the water entering the flush port 170.

It should be recognized that different types of valves may be used to control whether water may flow through the inlet 112, outlet 128, and/or flush port 170. For example, a conventional hose cap may be used to close off the flush port 170, manually opened when flushing out the pump 110 and otherwise left closed.

Figure 5:
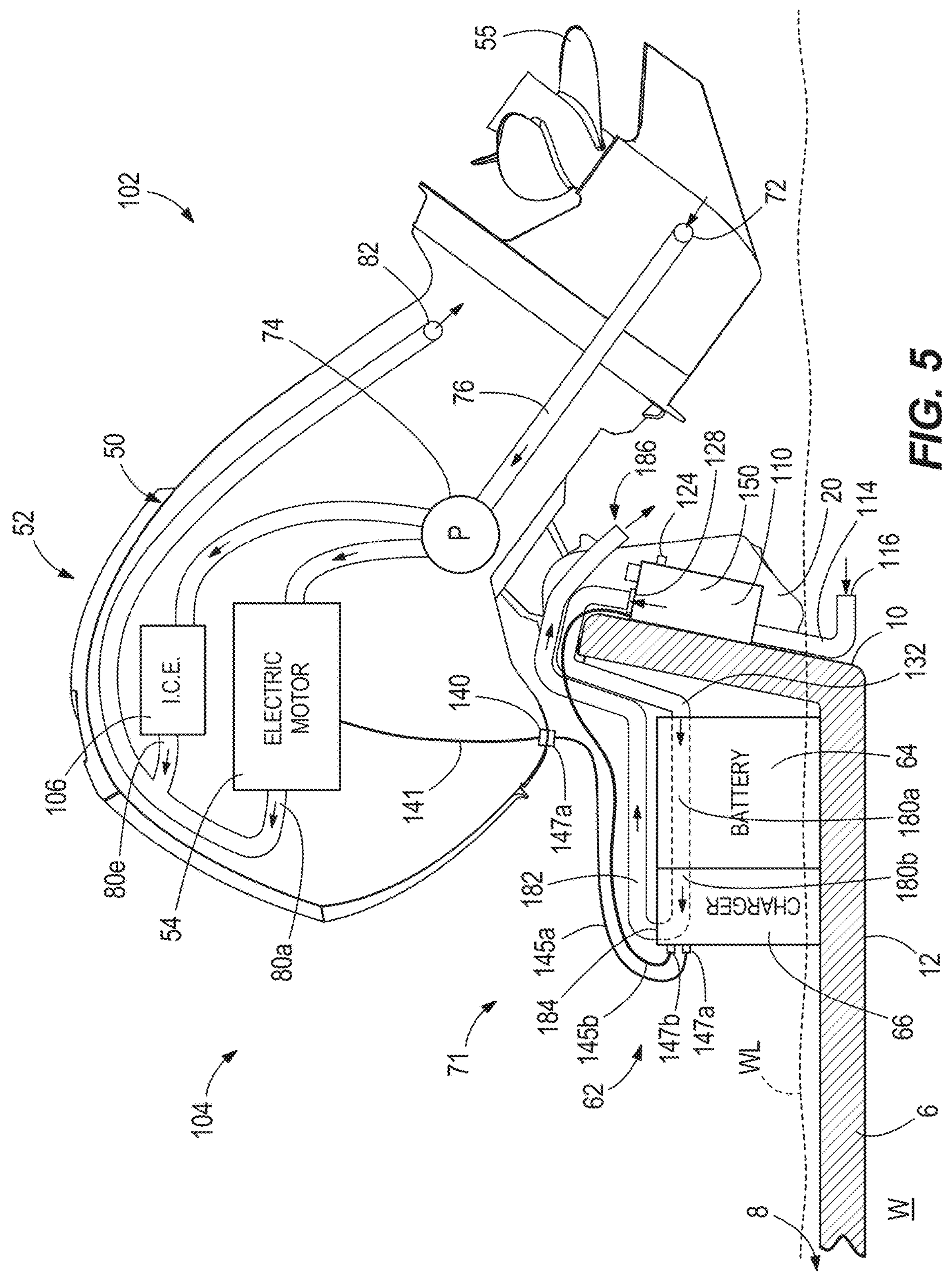
FIG. 5 is a sectional side view of another embodiment of a marine drive and a marine vessel having a cooling system according to the present disclosure.

FIG. 5 shows another embodiment of marine drive 102 and marine vessel 104 configured according to the present disclosure. The powerhead 52 is a hybrid system including an ICE 106 and an electric motor 54 as discussed above, which are cooled in a conventional manner via a pump 74 located inside the casing 50. The electric motor 54 is powered by the power system 62, which includes a battery 64 and a charger 66 that are together located outside the casing 50 (e.g., here at a position inside the marine vessel 104). The battery 64 and charger 66 are connected to each other via internal wiring in a manner known in the art. Power is provided from the battery 64 to the electric motor 54 via a wire 145*a* having connectors 147*a* at the ends, which may be similar to the wire 144 and corresponding connectors 146 discussed above (which electrically connect the pump 110 to the power system 62 outside the casing 50, see FIG. 3). One of the connectors 147*a* of the wire 145*a* is coupled to the power system 162 with the other connector 147*a* being coupled to a connector 140 in the casing 50. The connector 140 is electrically connected to the electric motor 54 via a wire 141 inside the casing 50.

The battery 64 provides power to operate the pump 110 within the cooling system 71 as discussed above, here via connection with a wire 145*b* having connections 147*b* at each end. This design advantageously permits the power system 62 to be easily connected to both the casing 50 and the pump 110 for use, and likewise easily disconnected to remove the power system 62 from the marine vessel 104 as needed.

With continued reference to FIG. 5, the pump 110 is coupled to the mounting bracket 20 that also couples the marine drive 102 to the marine vessel 104, shown here as a transom bracket. The pump 110 may be coupled to the mounting bracket 20 via fasteners (e.g., via tabs 124 as discussed above), welding, or other methods known in the art. Alternatively, the housing 150 of the pump 110 may be partially formed with the mounting bracket 20 itself. In each case, the pump 110 is advantageously moveable with the marine drive 102 such that both are coupled to or removed from the marine vessel 104 together.

The pump 110 draws in the water W from the conduit 114 positioned in the water W. In this embodiment, the first end 116 of the conduit 114 does not extend below the bottom 12 of the hull 6, thereby preventing drag and/or collision with objects in the water. The first end 116 opens rearwardly, which the inventors have recognized advantageously provides a non-turbulent supply of water from trailing behind the hull 6 during forward operation of the marine vessel 104. By orienting the first end 116 of the conduit 114, the amount of debris entering the cooling system is reduced and reduces the likelihood of obstructing the inlet 112 of the pump 110.

With continued reference to FIG. 5, the pump 110 provides the water to cool the power system 62 via a conduit 132 connected to the outlet 128 of the pump 110. The water then circulates through the power system 62 via internal conduits 180*a*, 180*b* (e.g., within a water jacket surrounding the battery 64 and/or charger 66) to cool the battery 64 and the charger 66. The water then flows away from the power system 62 via another conduit 182, which extends over the hull 6 at the stern 10 to dump the water overboard again. The conduit 182 may be removably coupled at a first end 184 to the power system 62, providing for convenient attachment and removal. A second end 186 of the conduit 182 may be coupled to the mounting bracket 20 and/or hull 6 so as to control where the water is dumped, which in certain embodiments is underwater. It should be recognized that the conduits 114, 132, and/or 182 may be partially formed within the mounting bracket 20 and/or hull 6 (see e.g., FIG. 8). However, the different configurations still advantageously avoid the need for any openings in the hull 6 below the waterline WL, decreasing the cost and the risk of leaks for the marine vessel 104. The configuration allows the power system 62 to be outside the casing 50, and also to be cooled without requiring the casing 50 to be positioned in the water.

Figure 6:
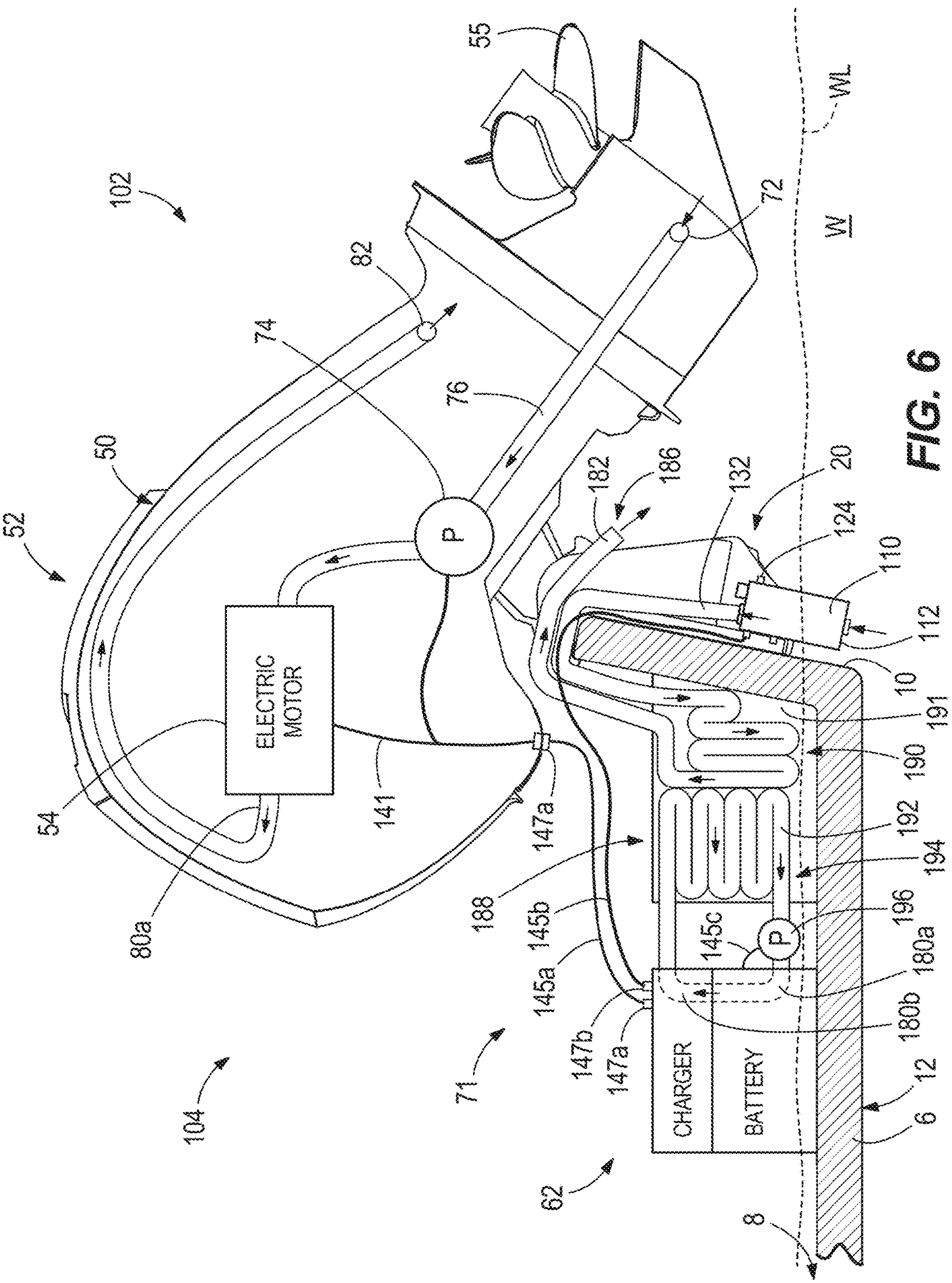
FIG. 6 is a sectional side view of another embodiment of a marine drive and a marine vessel having a cooling system according to the present disclosure.

FIG. 6 depicts another embodiment of marine drive 102 and marine vessel 104 in which the cooling system 71 further includes a heat exchanger 188, which may be a heat exchanger known in the art (e.g., described in U.S. Pat. No. 7,264,520). The heat exchanger 188 includes a first circuit 190 through which water may flow, and also a second circuit 194 through which another fluid may flow (which may also be water or a different liquid). The liquid (water) within the first circuit 190 remains separate from the liquid within the second circuit 194 within the heat exchanger 188 but exchange heat therebetween.

The first circuit 190 is formed by or otherwise connected to the conduit 132 conveying water from the pump 110. After passing through the first circuit 190 in the heat exchanger 188, the water then exits via the conduit 182 to be dumped overboard in the manner discussed above. The conduit 132 and/or conduit 182 may be integrally formed within the material 191 (e.g., cast aluminum) comprising the heat exchanger 188 to form the first conduit 190, or may be fluidly coupled to the first conduit 190 in a manner known in the art.

The second circuit 194 is formed by a conduit 192 that also extends through the heat exchanger 188 and is fluidly coupled to the conduits 180*a*, 180*b* passing through the battery 64 and the charger 66 of the power system 62 discussed above. A pump 196 causes the fluid to circulate inside the second circuit 194 (i.e., from the conduit 192 to the conduit 180*a* to the conduit 180*b* and back to the conduit 192). The pump 196 maybe powered by the power system 62 (e.g., via a wire 145*c*) in a similar manner to the pump 110 as discussed above.

The heat exchanger 188 is configured such that the water flowing through the first circuit 190 (from the pump 110) cools the fluid flowing through the second circuit 194, which in turn cools the power system 62 when flowing therethrough. By way of example, the fluid in the second circuit 194 may be a water and ethylene glycol mixture (e.g., 1:1 ratio), a water propylene glycol mixture, dielectric oil, or other coolants known in the art. The present inventors have recognized that by using a fluid other than the water surrounding the marine vessel 104 to cool the power system 62, smaller conduits 180*a*, 180*b* may be used to provide the same cooling effect, which saves space and/or permits lower flow rates. The cooling system 71 may also permit use in warmer bodies of water in which there would not be a sufficient temperature difference to adequately cool the power system 62. The use of a different fluid also avoids debris, corrosion, and fouling of the power system 62, increasing the durability and reliability of the battery 64, charger 66, and/or other electronics involved in charging, discharging, and maintaining the energy within the power system 62.

FIG. 6 further shows an alternative location for mounting the pump 110 to the mounting bracket 20. In this configuration, the pump 110 is positioned such that its inlet 112 is located underwater when the marine vessel 104 is in the water W. This eliminates the need for a separate conduit extending between the water W and the inlet 112 (e.g., the conduit 114 of FIG. 5). Additionally, the present inventors have recognized that by positioning the inlet 112 directly in the water, the pump 110 is advantageously self-priming. In other words, the cavity with pump 110 is sufficiently full of water so as to operate essentially immediately when powered- and with increased efficiency-over needing to draw sufficient liquid into the cavity before the pump 110 becomes effective in pumping water.

Figure 7:
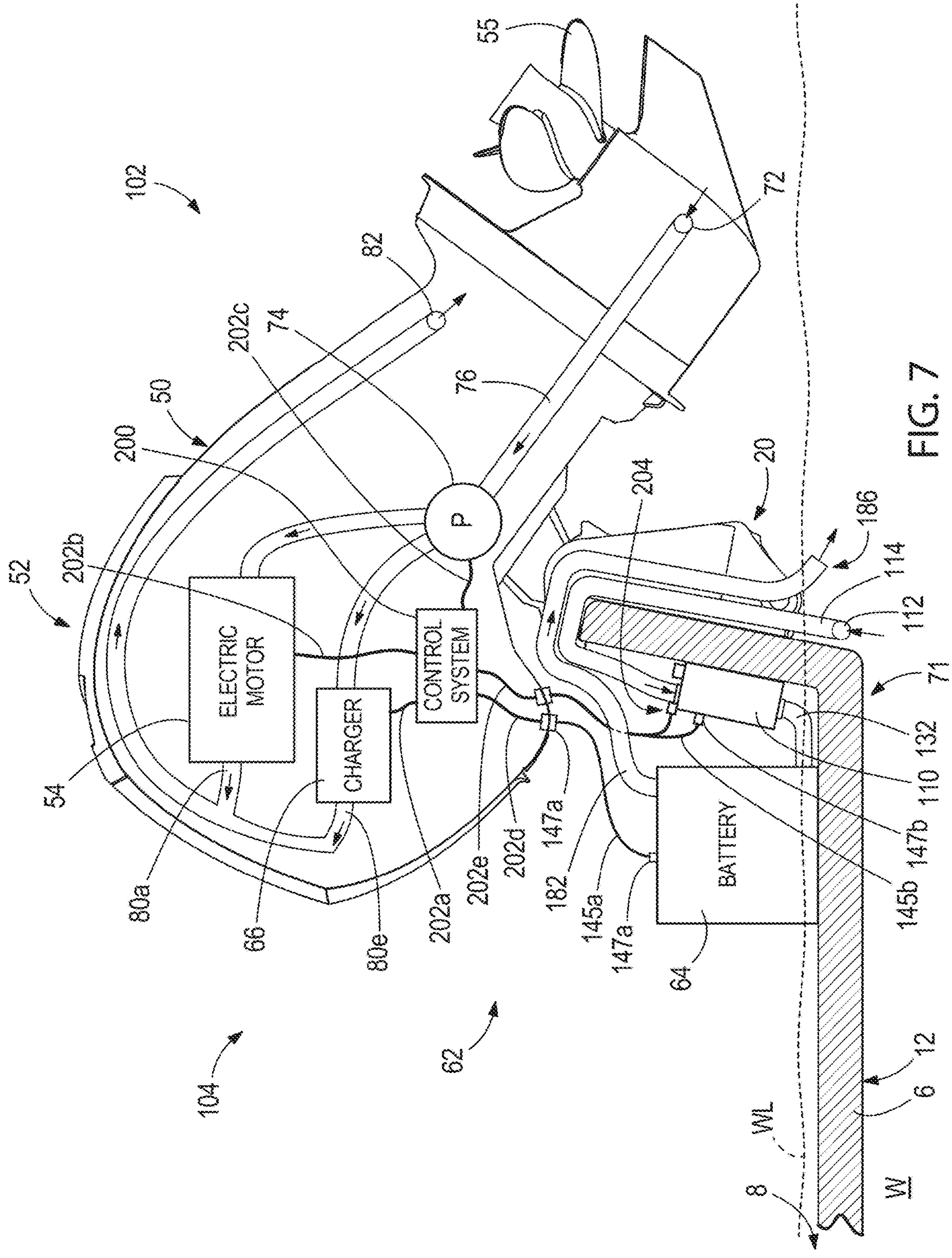
FIG. 7 is a sectional side view of another embodiment of a marine drive and a marine vessel having a cooling system according to the present disclosure.

FIG. 7 depicts a further embodiment in which the cooling system 71 includes components both inside and outside the casing 50. In particular, the charger 66 is located inside the casing 50 and is electrically coupled to the battery 64 located outside the casing 50. Specifically, the charger 66, as well as the electric motor 54 and the pump 74, are electrically connected to a control system 200 via wires 202*a*-202*c*. Likewise, the control system 200 is electrically coupled to the pump 110 and the battery 64 via wires 202*d*, 202*e*, respectively. Additional information regarding the control system 200 is provided below. The control system 200 is located inside the casing 50 to be protected from the elements. The control system 200 is also electrically connected to the battery 64, here via a wire 202*d* inside the casing 50 that is connected to a wire 145*a* outside the casing through a connector 147*a* therebetween. The control system 200 controls the flow of power between the battery 64, the charger 66, the electric motor 54, and the pumps 74, 110. The control system 200 is particularly configured to power the pump 110 when the charger 66 is charging the battery 64, and/or when internal temperatures measured by sensors within the charger 66 or battery 64 reach threshold values. By way of example, these threshold values may include a threshold of 40° C. for a battery cell temperature and 50° C. for a charger. Temperature sensors 204 may also or alternatively be positioned to measure the temperature of the water in the conduits 114, 132, and/or 186.

Figure 8:
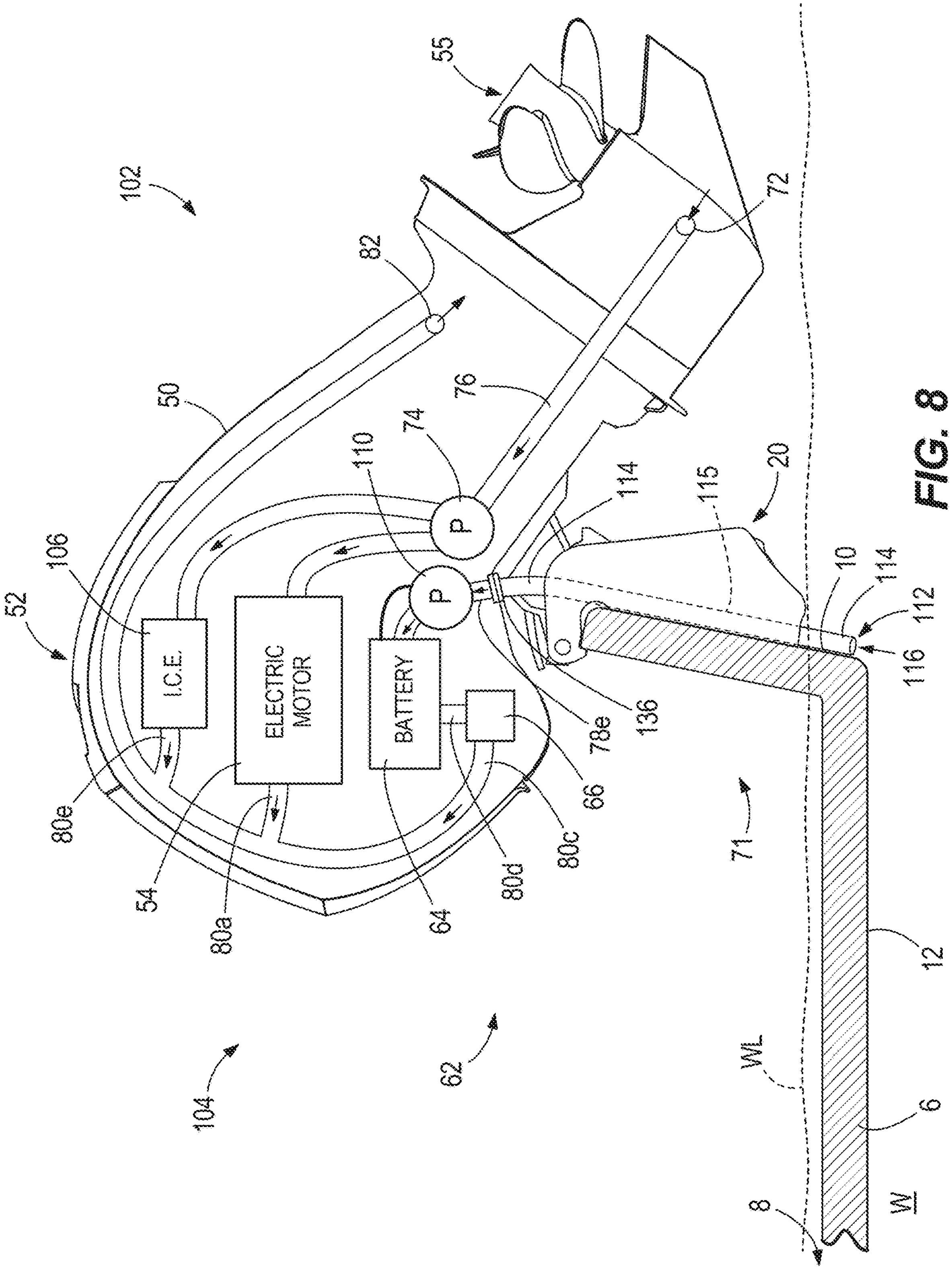
FIG. 8 is a sectional side view of another embodiment of a marine drive and a marine vessel having a cooling system according to the present disclosure.

FIG. 8 shows an embodiment similar to that of FIG. 2, but with the pump 110 located inside the casing 50 rather than being coupled to the hull 6 or the mounting bracket 20. The conduit 114 between the water W and the pump 110 extends through an opening 115 formed with the mounting bracket 20. The conduit 114 is flexible such that the casing 50 may be trimmed via the mounting bracket 20 without impacting the flow of water to the pump 110 or to the casing 50. The conduit 114 is also configured such that the first end 116 is positioned underwater when the marine vessel 104 is positioned in the water W with the marine drive 102 coupled to the hull 6. The present inventors have recognized that this configuration advantageously provides protection for both pumps 74, 110, as well as for all wires between the power system 62 and the cooling system 71. Additionally, the marine drive 102 is easily attached to or removed from the hull 6 of the marine vessel 104 without any further connections (communication, power, or fluid) required for the cooling system 71.

Figure 9:
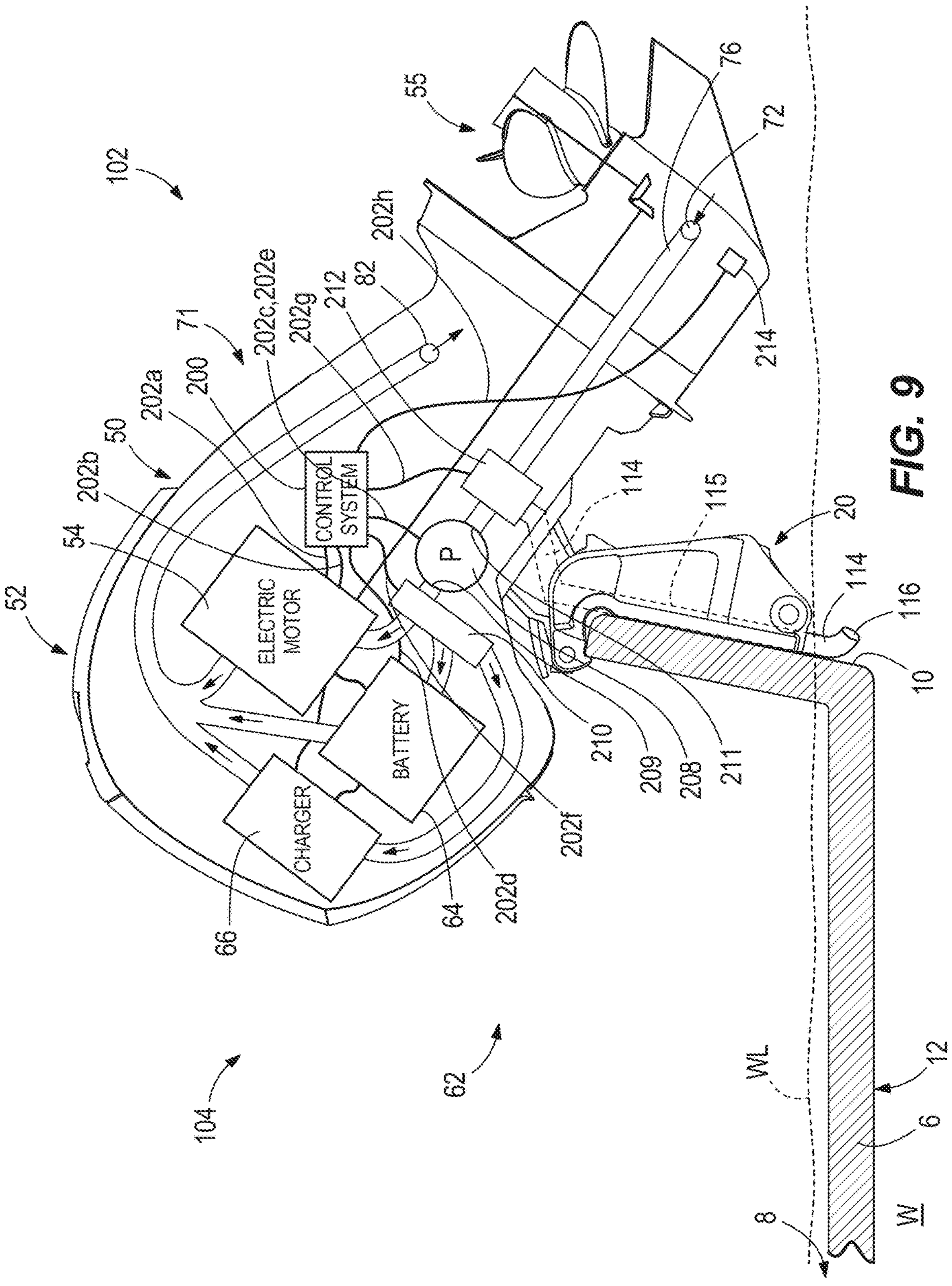
FIG. 9 is a sectional side view of another embodiment of a marine drive and a marine vessel having a cooling system according to the present disclosure.

A further embodiment is shown in FIG. 9, whereby a single pump 208 is used for drawing in water via the inlet 72 in the casing 50 (i.e., when the casing 50 is in the water), and also via the conduit 114 outside the casing when the casing 50 is not in the water W. A first valve 210 is coupled to an outlet 209 of the pump 208 and a second valve 212 is coupled to an inlet 211 of the pump 110. The first valve 210 is controllable to open and close flow paths therein from the outlet 209 of the pump 208 to the electric motor 54, the battery 64, and/or the charger 66 based on which of these components requires cooling (e.g., with reference to internal temperature sensors or other mechanisms known in the art). Likewise, the second valve 212 is controllable to open and close flow paths therein to the inlet 211 of the pump 208 from the conduit 114 and/or from the inlet 72 in the casing 50.

The control system 200 is further connected, via a wire 202*h*, to a sensor 214 to the casing 50. The sensor 214 is configured to detect whether it is located in water, thereby indicating whether the casing 50 (and the inlet 72 thereof) is located in the water. It should be recognized that other mechanisms may be used for determining whether the inlet 72 is in the water W, including monitoring flow sensors within the second valve 212.

The control system 200 is configured to control the operation of the first valve 210 and the second valve 212 via connections through wires 202*f* and 202*g*, as well as operation of the pump 208, charger 66, and electric motor 54. When the powerhead 52 and/or power system 62 requires cooling, the control system 200 determines whether the inlet 72 in the casing 50 is in the water (via the sensor 214). If the inlet 72 is not in the water W, the second valve 212 is operated so as to close the flow path to the pump 208 from the inlet 72 and to open the flow path from the conduit 114. Alternatively, when the inlet 72 is determined to be in the water W, the second valve 212 may be operated such that water only flows from the inlet 72, or such that water flows from both the inlet 72 and the conduit 114.

The present inventors have recognized that this configuration of cooling system 71 advantageously reduces the need for having two separate pumps, one for cooling the powerhead 52 and another for cooling the battery 64 and charger 66.

Additional examples are now provided for different control methods for operating the cooling systems and marine drives disclosed herein. One embodiment provides for predictive cooling of components. The control system 200 monitors a discharge rate and/or a charging rate of the battery, which are compared to one or more thresholds. If the discharge rate and/or charging rate are found to exceed the corresponding thresholds, the cooling system is operated to proactively provide cooling for the battery, recognizing that the battery will be heating up.

Another embodiment provides for extended cooling. The control system 200 is configured to continue operating the cooling system after propulsion by the marine drive has stopped. By way of example, the control system 200 may continue operating the pump for a set duration, such as 5 minutes, or may continue to operate until the temperature of the battery or another component falls below a given threshold, e.g., 40° C.

In another embodiment, the control system 200 is configured to operate the cooling system intermittently. By way of example, the control system 200 may operate the pump to cycle between being on for a first period of time and off for a second period of time. In certain cases, as discussed above, some amount of cooling is provided by the cooling system without operating the pump. Therefore, this method allows for a first flow rate of coolant through the cooling system when the pump is off, periodically increasing to a second flow rate when the pump is on. The present inventors have recognized that this control method reduces the energy consumption of the cooling system, while also reducing noise during the second period of time in which the pump is off. It should be recognized that the control system 200 may also operate the cooling system intermittently other than between on and off states of the pump. For example, the cooling system may be controlled to intermittently operate the pump between a 100% flow rate and a reduced flow rate, such as 50%.

In another embodiment, the control system 200 is configured to control the cooling system based on the operation of the marine drive's powerhead. The present inventors have recognized that in the case of a powerhead comprising an electric motor, energy (e.g., from a battery) is needed for both operating the powerhead and operating the cooling system. Therefore, the present inventors have recognized that it is advantageous for the controlling system 200 to not operate the pump of the cooling system when the demand on the powerhead is high (subject to temperatures remaining below thresholds). For example, the control system 200 may be configured to not operate the pump when there is a demand for operating the powerhead at 70% or more of its maximum RPM or power output, thereby preserving energy for the powerhead to meet this demand. In another example, the control system 200 is configured to turn off the pump when there is a demand for the powerhead to accelerate beyond a given threshold (e.g., measured as an angular rate of change for a throttle).

Another embodiment provides for operating the cooling system as a function of ambient temperature. The present inventors have recognized that when a marine drive is subjected to high ambient temperatures, the temperatures of the batteries are increased even when the batteries are not being charged nor discharged. In view of this, the control system 200 may be configured to operate the cooling system when the ambient temperature is measured to exceed a threshold value. This control may be implemented to proactively cool a battery (or other elements) before charging or discharging does occur, and/or to maintain optimum temperatures for the battery so as to extend its life. The control system 200 may control be configured to also operate the pump as a function of battery temperature, thereby preventing the cooling system from consuming excess energy or cooling the battery below its optimum temperature.

Figure 10:
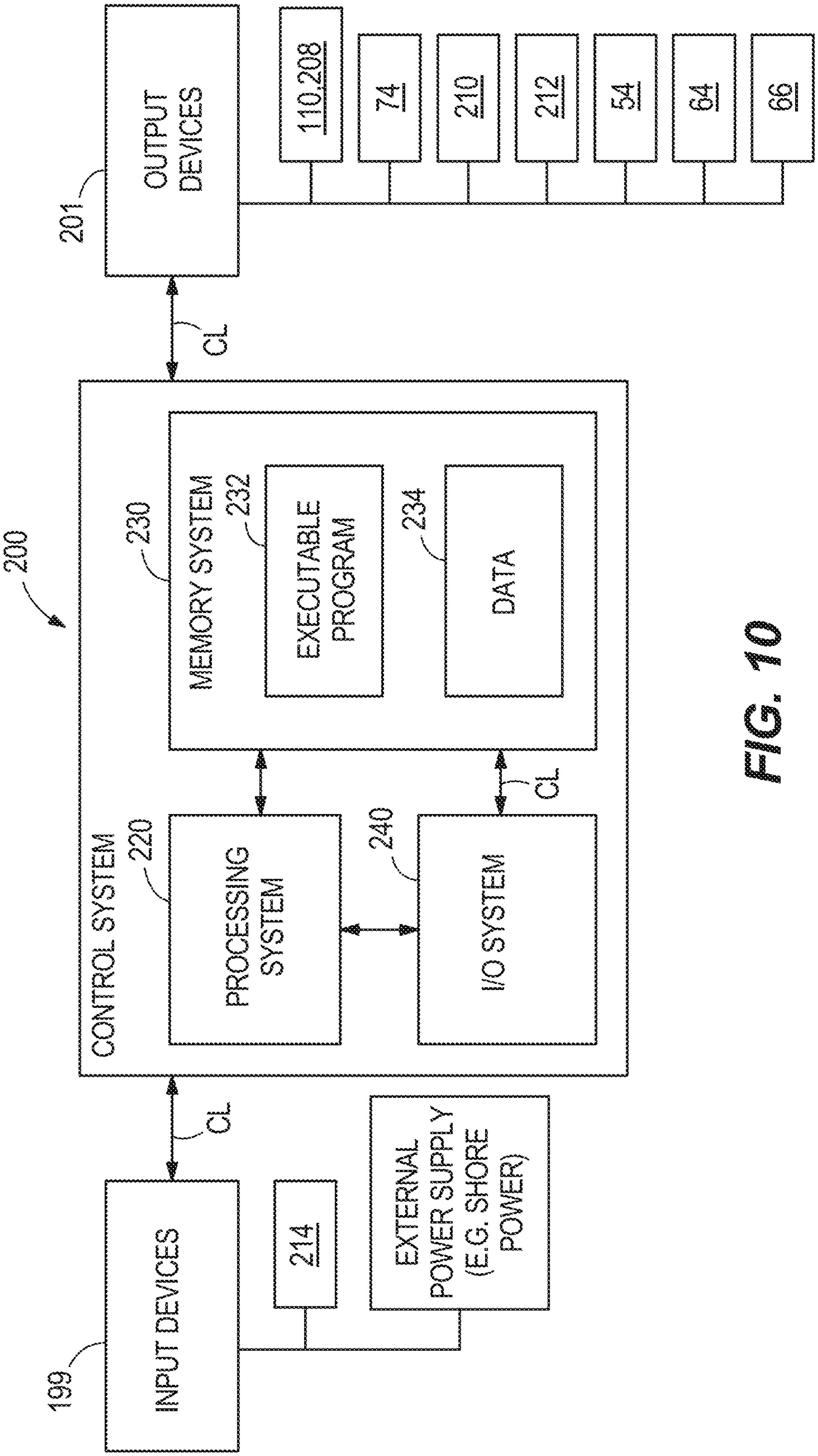
FIG. 10 is a schematic view of a control system for controlling a cooling system according to the present disclosure.

Additional information is now provided for the control system 200 with reference to FIG. 10. Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 200 communicates with each of the one or more components of the marine drive 102 and/or marine vessel 104 via a communication link CL, which can be any wired or wireless link. It should be recognized that the communication links CL generally include any connections discussed above. The control system 200 is capable of receiving information and/or controlling one or more operational characteristics of the marine drive 102 and/or marine vessel 104 and its various subsystems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine drive 102 and/or marine vessel 104. Moreover, the communication link CL lines are meant only to demonstrate that the various control elements are capable of communicating with one another, and do not represent actual wiring connections between the various elements, nor do they represent the only paths of communication between the elements. Additionally, the marine drive 102 and/or marine vessel 104 may incorporate various types of communication devices and systems, and thus the illustrated communication links CL may in fact represent various different types of wireless and/or wired data communication systems.

The control system 200 may be a computing system that includes a processing system 220, memory system 230, and input/output (I/O) system 240 for communicating with other devices, such as input devices 199 and output devices 201. The input devices 199 may include different sensors as discussed above, as well as an external power source (e.g., shore power). The output devices 201 may include the pumps 74, 110 discussed above, as well as the electric motor 54, battery 64, charger 66, and other valves and components discussed above. The processing system 220 loads and executes an executable program 232 from the memory system 230, accesses data 234 stored within the memory system 230, and directs the cooling system 71 to operate as described above.

The processing system 220 may be implemented as a single microprocessor or other circuitry or be distributed across multiple processing devices or sub-systems that cooperate to execute the executable program 232 from the memory system 230. Non-limiting examples of the processing system include general purpose central processing units, application specific processors, and logic devices.

The memory system 230 may comprise any storage media readable by the processing system 220 and capable of storing the executable program 232 and/or data 234 (e.g., temperature thresholds for operating the cooling system 71). The memory system 230 may be implemented as a single storage device or be distributed across multiple storage devices or sub-systems that cooperate to store computer readable instructions, data structures, program modules, or other data. The memory system 230 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

In this manner, the presently disclosed marine devices and marine vessels are configured for providing cooling as necessary, but without requiring the marine device in the water in the process. This may be particularly advantageous in the context of propulsors incorporating electric motors, which through fast charging require extensive cooling when the marine drive would not otherwise need to be kept in the water.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A marine drive for propelling a marine vessel in water, the marine drive comprising:

a casing configured to be coupled to the marine vessel, the casing being positionable in the water;

an electric motor supported by the casing so as to be steerable therewith;

a propulsor supported by the casing and operatively coupled to the electric motor, the propulsor being configured to generate a thrust force in the water at least via operation of the electric motor;

a power system configured to electrically power the electric motor; and a cooling system for cooling the power system, the cooling system comprising a pump located outside the casing and being configured to pump the water for cooling of the power system, wherein the marine drive is coupled to the marine vessel so as to be trimmable out of the water, wherein the pump is coupled inside the marine vessel or wherein the pump is coupled to the marine drive so as to be removable from the marine vessel therewith, and wherein the cooling system is configured to cool the power system using the water while the marine drive is trimmed out of the water and without passing through a hull of the marine vessel.

2. The marine drive according to claim 1, further comprising a mounting bracket configured to mount the casing to the marine vessel, wherein the pump is on the mounting bracket.

3. The marine drive according to claim 2, wherein the marine drive comprises an outboard motor and wherein the mounting bracket comprises a transom bracket.

4. A marine drive for propelling a marine vessel in water, the marine drive comprising:

a casing configured to be coupled to the marine vessel, the casing being positionable in the water;

a propulsor supported by the casing, the propulsor being configured to generate a thrust force in the water;

a power system configured to power the propulsor, wherein at least a portion of the power system is located in the casing;

a cooling system for cooling the power system, the cooling system comprising a pump located outside the casing and being configured to pump the water for cooling at least the portion of the power system in the casing; and a mounting bracket configured to mount the casing to the marine vessel, wherein the pump is on the mounting bracket, and wherein the pump is located on the mounting bracket such that the pump is at least partially submerged when the marine drive is coupled to marine vessel and the marine vessel is in the water.

5. The marine drive according to claim 1, wherein the power system comprises a battery configured to power the electric motor and a battery charger configured to charge the battery.

6. The marine drive according to claim 1, wherein the cooling system comprises a water jacket configured to receive the water from the pump to cool the power system.

7. The marine drive according to claim 1, further comprising a mounting bracket configured to mount the casing to the marine vessel, the cooling system further comprising a conduit configured to convey the water to the pump, wherein the conduit is located on the mounting bracket so as to position an inlet of the conduit in the water when the marine drive is coupled to marine vessel and the marine vessel is in the water.

8. The marine drive according to claim 7, wherein the conduit is configured such that the inlet opens primarily horizontally when the marine drive is coupled to marine vessel and the marine vessel is in the water.

9. The marine drive according to claim 1, wherein the propulsor is rotatable via the electric motor and/or another powerhead, wherein an inlet is formed in the casing, and wherein the pump is a first pump, further comprising a second pump located inside the casing, the second pump being configured to provide additional water, via the inlet in the casing, for cooling the electric motor and/or the another powerhead when the casing is in the water.

10. The marine drive according to claim 1, further comprising a flush port fluidly coupled to the pump through which clean water may be provided to flush the water out of the pump.

11. The marine drive according to claim 1, the cooling system further comprising a heat exchanger fluidly coupled to the pump, the heat exchanger comprising a first circuit through which the water may flow and a second circuit through which a fluid may flow while remaining separated from the water, wherein the heat exchanger is configured such that the water cools the fluid and the fluid cools the power system.

12. The marine drive according to claim 11, wherein the heat exchanger is located outside the casing.

13. A marine drive for propelling a marine vessel having a hull in water, the marine drive comprising:

a casing configured to be coupled to the marine vessel, the casing being positionable in the water;

a propulsor supported by the casing, the propulsor being configured to generate a thrust force in the water;

a power system configured to electrically power the propulsor, wherein at least a portion of the power system is located in the marine vessel; and a cooling system for cooling the power system, the cooling system comprising a pump located outside the casing and being configured to pump the water for cooling at least the portion of the power system, wherein the pump receives the water without passing through the hull of the marine vessel.

14. The marine drive according to claim 13, further comprising a mounting bracket configured to mount the casing to the marine vessel, and further comprising a conduit supported by the mounting bracket and configured for the water to flow to the pump therethrough, wherein the conduit is located so as to position an inlet of the conduit in the water when the marine drive is coupled to marine vessel and the marine vessel is in the water.

15. The marine drive according to claim 13, wherein the propulsor is rotated by a powerhead, wherein an inlet is formed in the casing, and wherein the pump is a first pump, further comprising a second pump located inside the casing, the second pump being configured to provide additional water, via the inlet in the casing, for cooling the powerhead when the casing is in the water.

16. A marine vessel configured to float in water, the marine vessel comprising:

a hull;

a marine drive coupled to the hull, the marine drive comprising:

a casing configured to be coupled to the marine vessel, the casing being positionable in the water; and a propulsor supported by the casing, the propulsor being configured to generate a thrust force in the water;

a power system configured to electrically power the propulsor, wherein at least a portion of the power system is located in the marine vessel; and a cooling system for cooling the power system, the cooling system comprising a pump positioned outside the casing and configured to pump the water for cooling at least the portion of the power system without passing through a portion of the hull that is submerged when the marine vessel is floating in the water.

17. The marine vessel according to claim 16, wherein the cooling system is at least partially located inside of the hull.

18. The marine vessel according to claim 16, wherein the pump is mounted outside the hull.

19. The marine vessel according to claim 16, wherein the power system comprises a battery configured to power the propulsor and a battery charger configured to charge the battery, the battery and the battery charger each being located inside the casing, and wherein the power system comprises an electric motor located inside the casing and configured to rotate the propulsor.

20. The marine vessel according to claim 16, wherein the hull extends between a bow and a stern with the marine drive being coupled at the stern, and wherein an inlet of a conduit opens towards the bow such that ram pressure assists in conveying the water to the pump when the marine vessel is propelled forwardly in the water.

21. The marine vessel according to claim 16, the cooling system further comprising a heat exchanger located outside the casing and being fluidly coupled to the pump, the heat exchanger comprising a first circuit through which the water may flow and a second circuit through which a fluid may flow while remaining separated from the water, wherein the heat exchanger is configured such that the water cools the fluid and the fluid cools the power system.

22. The marine vessel according to claim 16, wherein the power system further comprises another portion outside the casing, and wherein the water pumped for cooling at least the portion of the power system in the casing also cools the another portion of the power system.

* * * * *